United States Patent [19]

Gagliardi, Jr.

[11] Patent Number: 5,088,957
[45] Date of Patent: Feb. 18, 1992

[54] METHOD FOR BUTCHERING A POULTRY CARCASS AND CUTS RESULTING THEREFROM

[75] Inventor: Eugene D. Gagliardi, Jr., West Chester, Pa.

[73] Assignee: Designer Foods, Inc., Wilmington, Del.

[21] Appl. No.: 586,658

[22] Filed: Sep. 24, 1990

[51] Int. Cl.⁵ ............................................. A22C 21/00
[52] U.S. Cl. ................................... 452/149; 452/155; 426/644
[58] Field of Search ............... 452/155, 149, 135, 136, 452/160, 164; 426/644

[56] References Cited

U.S. PATENT DOCUMENTS

| | | |
|---|---|---|
| 3,570,050 | 3/1991 | Draper et al. .......... 452/149 |
| 3,942,222 | 3/1976 | Strandine et al. ...... 452/149 |
| 4,019,223 | 4/1977 | Baker ..................... 452/160 |
| 4,503,587 | 3/1985 | Martin . |
| 4,536,919 | 8/1985 | Cashwell et al. . |
| 4,557,017 | 12/1985 | Gasbarro . |
| 4,564,976 | 1/1986 | Beech et al. . |
| 4,567,624 | 2/1986 | van Mil . |
| 4,586,215 | 5/1986 | Meyn . |
| 4,688,297 | 8/1987 | Bartels . |
| 4,815,168 | 3/1989 | van den Nieuwelaar et al. .................. 452/149 |
| 4,827,570 | 5/1980 | Scheier et al. . |
| 4,849,245 | 7/1989 | Galbraith ............... 452/149 |
| 4,873,746 | 10/1989 | Scheier et al. . |

Primary Examiner—Willis Little
Attorney, Agent, or Firm—Panitch, Schwarze, Jacobs & Nadel

[57] ABSTRACT

A method for butchering a poultry carcass to provide a wishbone cut comprising locating the breastbone on the outer surface of the poultry carcass and making a first cut into the poultry carcass along a line generally perpendicular to the breastbone and between the breastbone and the wishbone to a depth sufficient to provide a desired thickness of the wishbone cut. A second cut is then made along a line extending from the first cut generally parallel to the wishbone toward a point at which the wings join the wishbone, while pulling the cut portion of the carcass in a direction away from the breastbone. A third cut is then made through said wing/wishbone joints and the severed portion is removed.

3 Claims, 2 Drawing Sheets

METHOD FOR BUTCHERING A POULTRY CARCASS AND CUTS RESULTING THEREFROM

BACKGROUND OF THE INVENTION

The present invention relates to a method of butchering a poultry carcass to obtain a specific cut. More specifically, the invention is related to a method of butchering poultry carcasses in order to provide a wishbone cut.

Methods and apparatuses for butchering or otherwise obtaining the meat from poultry carcasses are well-known in the art. In view of the increasing demand for such new, innovative products as boneless breasts, tenders, etc., for both the commercial food market and for home use, methods for more easily obtaining increased amounts of meat from poultry carcass as in shorter time periods have become increasingly more desirable. However, the prior art methods have not proven to be entirely satisfactory in meeting these needs. Some of the prior art methods have proven to be inadequate in removing all of the desired meat from the poultry carcass, thereby resulting in increased waste of the poultry meat. Other prior art methods have proven to be either highly complicated due to the complexity of the machinery and/or equipment used or are difficult or expensive to employ due to increased amounts of labor required in cutting the poultry.

The present method overcomes such difficulties and provides an effective method for obtaining a wishbone cut from a poultry carcass in a simple and easily reproducible manner.

SUMMARY OF THE INVENTION

Briefly stated, the present invention relates to a method for butchering a chicken carcass and a wishbone cut portion formed by the method. The method comprises locating the breastbone o the outer surface of the poultry carcass and making a first cut into the carcass along a line generally perpendicular to the breastbone and between the breastbone and wishbone to a depth sufficient to provide a desired thickness of the wishbone cut. A second cut is then made along a line extending from the first cut generally parallel to the wishbone toward a point at which the wings join the wishbone, while pulling the cut portion of the poultry carcass in a direction away from the breastbone. The method further comprises cutting through the wing/wishbone joints and removing the severed wishbone portion

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

DETAILED DESCRIPTION OF THE INVENTION

Figure 1:
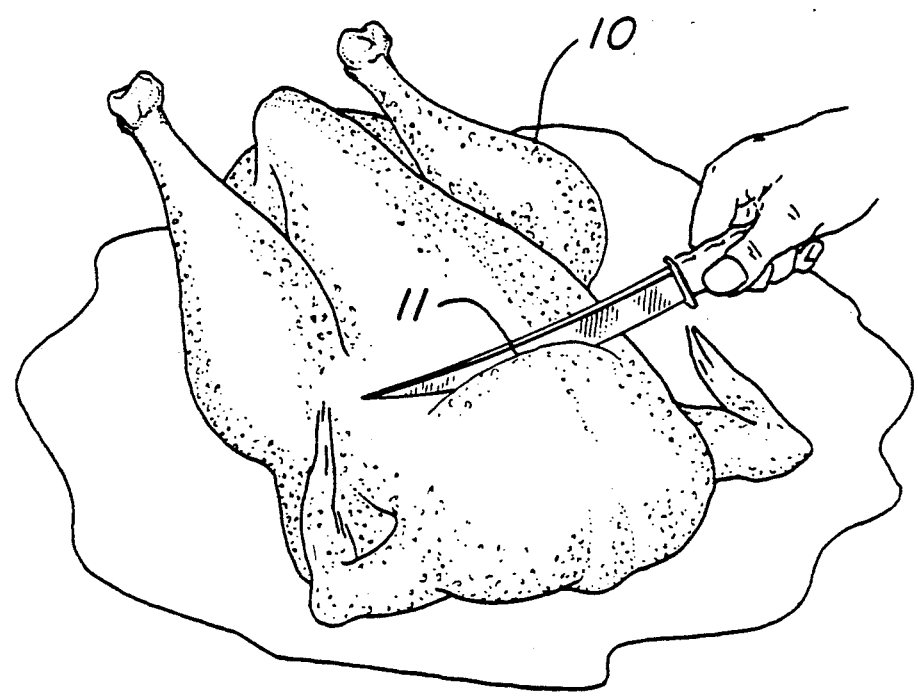
FIG. 1 is a perspective view of a chicken illustrating a first cut made after location of the breastbone on the carcass.
Figure 2:
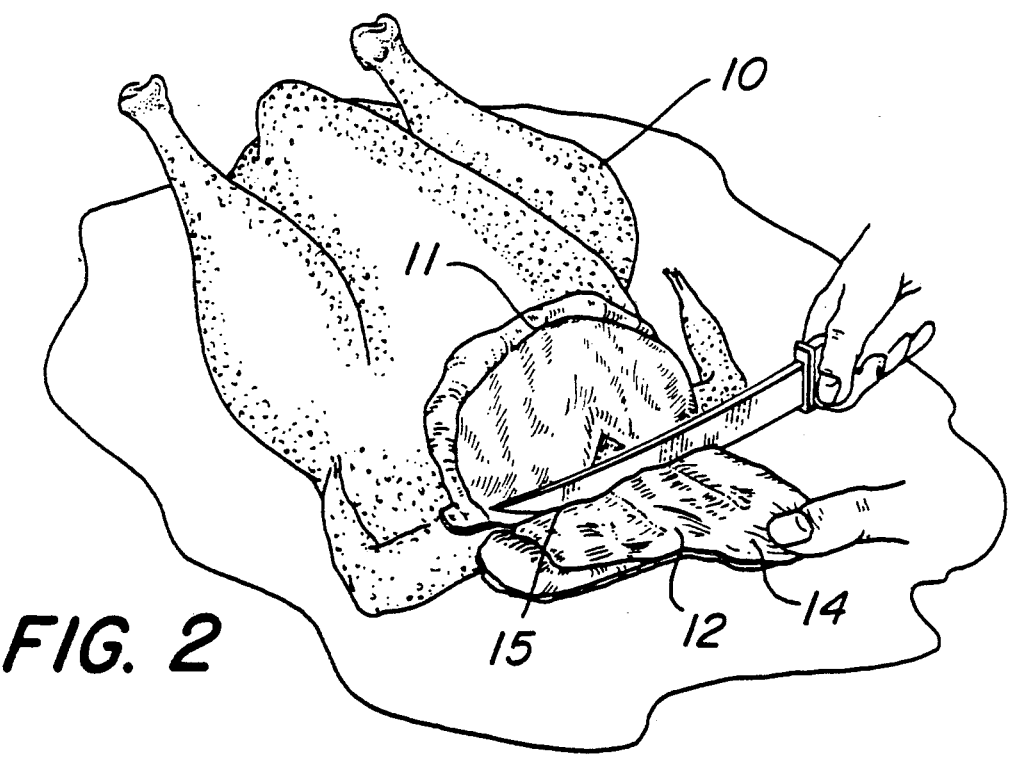
FIG. 2 is a view similar to FIG. 1 showing a second cut into the carcass.
Figure 3:
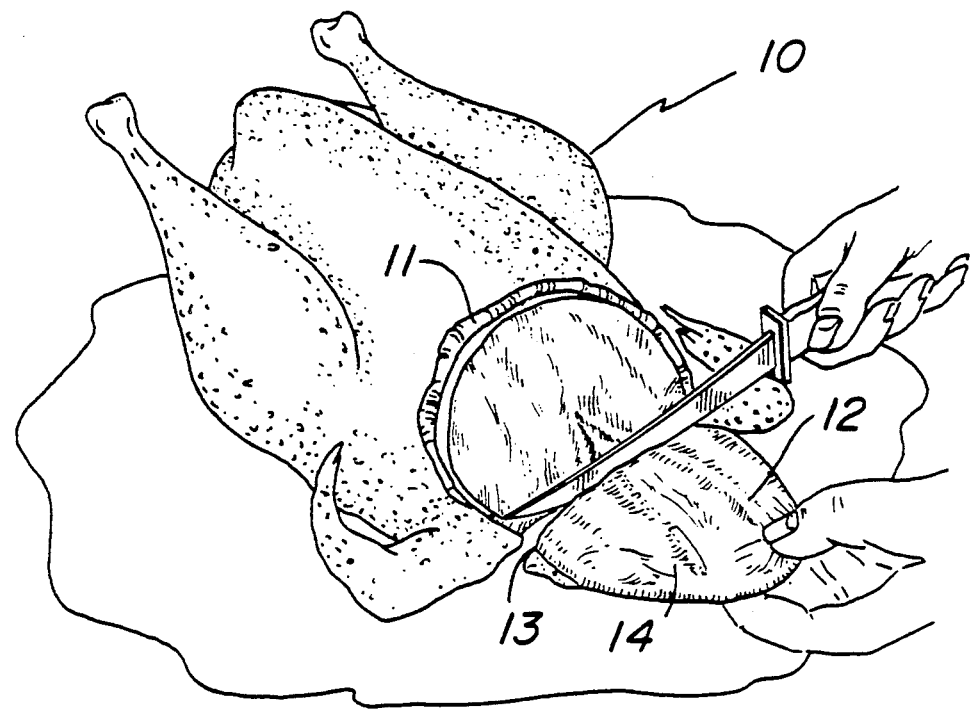
FIG. 3 is a view similar to FIG. 1 showing a cut made through the wing/wishbone joints.

Referring in detail to the drawings, wherein like numerals indicate like elements throughout, there is shown in FIGS. 1-3 a diagrammatical view of a chicken carcass 10 for illustrating the method of the present invention. The chicken carcass 10 includes a body portion a pair of legs and a pair of wings. FIGS. 1-3 are used for showing the location of the breastbone 11, the wishbone 12, the wing joints 13, and the wishbone cut portion 14 to be severed. The embodiment of the present invention demonstrated in the drawings, i.e., a method for butchering a chicken carcass, is for illustrative purposes only and is not intended to limit the present invention in any manner. It is to be understood that the present method is equally applicable to all types of fowl or poultry carcasses, including, duck, turkey, squab, etc., as well as to the chicken carcass 10 as illustrated.

In the presently preferred embodiment, the chicken carcass 10 is pr ®pared for butchering by first locating the breastbone 11 on the outer surface of the carcass 10. This can best be seen in FIG. 1. The breastbone 11 may be located visually but is generally located manually by feeling for it on the surface of the carcass 10. Once the breastbone 11 has been located, a first cut is made into the carcass 10 along a line which is generally perpendicular to the breastbone 11 and extends between the breastbone 11 and the wishbone 12 as illustrated in FIG. 1. The first cut should be made to a depth sufficient to provide a desired thickness of the wishbone cut 14 and should be made according to the thickness of the available meat as established by the size of the particular chicken carcass. In the presently preferred embodiment, the thickness of the wishbone cut 14 is between one half inch and one inch.

After the first cut is made, a second cut is made into the carcass 10 along a line extending from the first cut generally parallel to the wishbone 12. This step can best be seen in FIG. 2. Since the second cut extends from the first cut, a generally continuous, cut may be made. The second cut extends to a point 15 at which the wings join the wishbone 12. While the second cut is being made, the severed wishbone cut portion 14 of the carcass 10 should be simultaneously pulled from the carcass 10 in a direction away from the breastbone 11 as illustrated in FIG. 2. Preferably, the pulling is accomplished by gripping the portion of the wishbone cut 14 proximate the apex of the wishbone 12 as shown.

Referring now to FIG. 3, a third cut is then made completely through the wing/wishbone joints 13 of the carcass 10 and through any remaining meat and/or skin proximate the wishbone/wing joints. The severed wishbone cut portion 14 of the chicken carcass 10, which contains the wishbone 12, is then completely removed from the remainder of the carcass 10.

Figure 4:
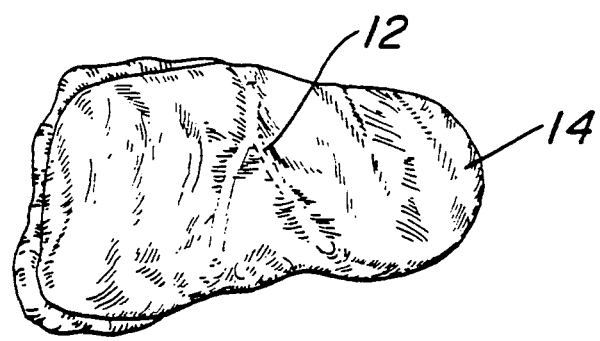
FIG. 4 is a top plan view of the wishbone cut produced by the present method.

FIG. 4 depicts the severed wishbone cut 14 which is the product of the process of the present invention. The present invention also encompasses this wishbone cut 14 produced by the described method. The wishbone cut 14 so produced is generally a full white meat portion containing the wishbone 12 which adds stability to permit the wishbone cut 14 to be conveniently picked up for consumption.

The process set forth above provides a novel cut of poultry which provides the white meat directly surrounding the wishbone of the poultry and provides support for this meat since the wishbone is actually simultaneously removed from the carcass and maintained within the cut portion. That is, in the present process the wishbone remains in the ultimately severed cut. In this regard, the present method contrasts with conventional methods of butchering poultry to provide breast meat portions, since such conventional methods generally involve cutting and removing the wishbone prior to removing the breast from the carcass or splitting the wishbone, the two portions of which are incorporated into the breast cuts.

When the severed wishbone portion 14 is removed from the poultry carcass 10, the skin necessarily remains thereon. However, depending upon the ultimate use which will be made of the severed wishbone cut portion 14, the skin may optionally be removed in a subsequent procedure such as by peeling or slicing of the skin (not illustrated).

The present method may be performed manually as described above or by a suitable automated procedure or apparatus (not shown). An appropriate automated procedure performs the steps disclosed above in generally the same manner and sequence disclosed above.

The present invention may be embodied in other specific forms without departing from the spirit or essential attributes thereof and, according, reference should be made to the appended claims, rather than to the foregoing specification, as indicating the scope of the invention.

I claim:

1. A method for butchering a poultry carcass to provide a wishbone cut comprising:

locating the breastbone on the outer surface of the poultry carcass;

making a first cut into the poultry carcass along a line generally perpendicular to the breastbone and between the breastbone and the wishbone to a depth sufficient to provide a desired thickness of the wishbone cut;

making a second cut into the poultry carcass along a line extending from the first cut generally parallel to the wishbone toward a point at which the wings join the wishbone while pulling the cut portion of the poultry carcass in a direction away from the breastbone;

cutting through said wing/wishbone joints; and removing the severed portion of the chicken carcass which contains the wishbone.

2. A method as in claim 1 further comprising removing the skin from said severed portion.

3. A poultry wishbone cut produced by the method comprising:

locating the breastbone on the outer surface of a poultry carcass;

making a first cut into the poultry carcass along a line generally perpendicular to the breastbone and between the breastbone and the wishbone to a depth sufficient to provide a desired thickness of the wishbone cut;

making a second cut into the poultry carcass along a line extending from the first cut generally parallel to the wishbone toward a point at which the wings join the wishbone while pulling the cut portion of the poultry carcass in a direction away from the breastbone;

cutting through said wing/wishbone joints; and removing the severed portion of the chicken carcass which contains the wishbone.

* * * * *